United States Patent
Cloud et al.

[19]

[11] Patent Number: 5,884,002
[45] Date of Patent: Mar. 16, 1999

[54] CABLE SPLICE ENCLOSURE SYSTEM WITH INTERCHANGEABLE OUTER HOUSING SIZES

[75] Inventors: Randy G. Cloud, Mentor; Jeff M. Gioitta, Lyndhurst; Erwin H. Goetter, Chesterland; Christopher S. Grubish, Twinsburg, all of Ohio

[73] Assignee: Preformed Line Products Company, Mayfield Village, Ohio

[21] Appl. No.: 956,886

[22] Filed: Oct. 22, 1997

Related U.S. Application Data

[62] Division of Ser. No. 635,396, Apr. 25, 1996, Pat. No. 5,790,740, which is a division of Ser. No. 426,624, Apr. 20, 1995, Pat. No. 5,631,993.

[51] Int. Cl.⁶ ........................................ G02B 6/26
[52] U.S. Cl. .......................... 385/135; 385/136; 385/137
[58] Field of Search ...................... 385/134–137

[56] References Cited

U.S. PATENT DOCUMENTS

| | | |
|---|---|---|
| Re. 34,955 | 5/1995 | Anton et al. . |
| 4,039,742 | 8/1977 | Smith . |
| 4,181,814 | 1/1980 | Smith . |
| 4,314,094 | 2/1982 | Smith . |
| 4,359,262 | 11/1982 | Dolan . |
| 4,424,412 | 1/1984 | Goetter et al. . |
| 4,428,645 | 1/1984 | Korbelak et al. . |
| 4,549,040 | 10/1985 | Goetter . |
| 4,558,174 | 12/1985 | Massey . |
| 4,620,815 | 11/1986 | Goetter . |
| 4,666,240 | 5/1987 | Caron et al. . |
| 4,679,869 | 7/1987 | Krafcik et al. ........................ 385/135 |
| 4,679,896 | 7/1987 | Krafcik et al. . |
| 4,687,289 | 8/1987 | DeSanti . |
| 4,733,019 | 3/1988 | Pichler et al. . |
| 4,743,209 | 5/1988 | Gittle . |
| 4,799,757 | 1/1989 | Goetter . |
| 4,805,979 | 2/1989 | Bossard et al. . |
| 4,808,772 | 2/1989 | Pichler et al. . |
| 4,927,227 | 5/1990 | Bensel, III et al. . |
| 5,042,901 | 8/1991 | Merriken et al. ...................... 385/135 |
| 5,185,845 | 2/1993 | Jones . |
| 5,245,133 | 9/1993 | DeCarlo et al. . |
| 5,261,024 | 11/1993 | Allen et al. . |
| 5,278,933 | 1/1994 | Husinger et al. . |
| 5,285,515 | 2/1994 | Milanowski et al. . |
| 5,323,478 | 6/1994 | Milanowski et al. . |
| 5,323,480 | 6/1994 | Mullaney et al. . |
| 5,402,515 | 3/1995 | Vidacovich et al. . |
| 5,446,823 | 8/1995 | Bingham et al. . |
| 5,450,518 | 9/1995 | Burek et al. . |
| 5,461,693 | 10/1995 | Pimpinella . |
| 5,490,229 | 2/1996 | Ghandeharizadeh et al. . |
| 5,631,993 | 5/1997 | Cloud et al. . |

*Primary Examiner*—Phan T. H. Palmer
*Attorney, Agent, or Firm*—Fay, Sharpe, Beall, Fagan, Minnich & McKee

[57] ABSTRACT

A housing assembly for enclosing and storing cable splices comprises axially spaced end plates defining a storage space and joined by a pair of rigid torque bars. A pair of opposed housing members contoured to enclose the end plates and the storage space are releasably and sealing clamped to each other and to the end plates. Carried by one of the bars at axially spaced locations are a pair of spaced rods which support a plurality of splice storage trays in stacked relationship.

23 Claims, 9 Drawing Sheets

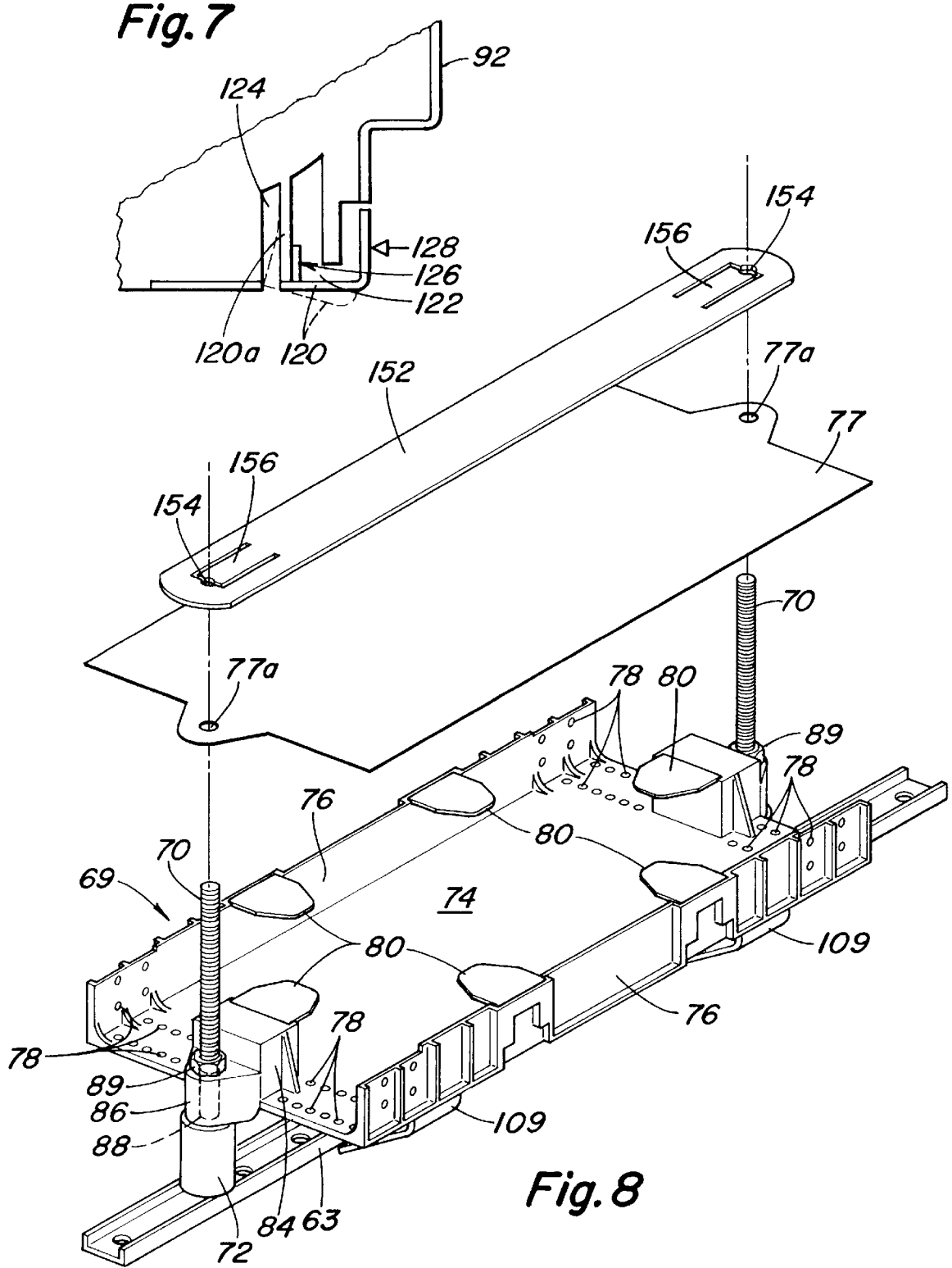

CABLE SPLICE ENCLOSURE SYSTEM WITH INTERCHANGEABLE OUTER HOUSING SIZES

This is a divisional of application Ser. No. 08/635,396, filed Apr. 25, 1996 now U.S. Pat. No. 5,790,740, which is a divisional of application Ser. No. 08/426,624, filed Apr. 20, 1995 now U.S. Pat. No. 5,631,993.

BACKGROUND OF THE INVENTION

The subject invention is directed to a waterproof cable splice enclosure assembly. Assemblies of the type under consideration are particularly suited for enclosing and housing fiber optic cables, and the invention will be described with particular reference thereto; however, the apparatus could equally well be used with other types of cables.

Many different types of fiber optic cable enclosures are known in the prior art. These prior enclosures are satisfactory to a greater or lesser degree but often have certain defects which make them inconvenient to use or prevent them from being readily adaptable to changing environments and conditions. It is, accordingly, a primary object of the subject invention to provide a cable enclosure assembly that is easy to assemble and use and which can be rapidly modified or adapted for differing uses and can be formed in a variety of different sizes with trays and/or internal supports that allow the size and number of splices to vary widely. In addition, the subject invention provides an enclosure that allows ready access for changing or adding to the number of splices in the enclosure. Enclosures according to the invention can be increased in effective size to accommodate system size increases without disturbing the previously stored splices.

SUMMARY OF THE INVENTION

In accordance with one aspect of the invention, there is provided a housing assembly for enclosing cable splices generally comprising a pair of housing members having main body portions with peripheral clamping flanges extending outwardly therefrom and cooperatively positioned in opposed relationship to be clamped together. The clamping flanges have inner end portions adjacent the main body portions and free outer end portions. A resilient sealing gasket is positioned between the inner end portions, and a rigid rib means is located at the free outer end portions. The total thickness of the rib means between opposed clamping flanges is greater than the normal uncompressed thickness of the sealing gasket such that when the clamping flanges are brought together, engagement takes place first on the rigid rib means and subsequent sealing engagement with the gasket requires application of sufficient clamping forces to produce deflection and torquing of the flanges about the rigid rib means.

The arrangement described above allows the gasket to be more uniformly compressed and provides improved gasket engagement.

In accordance with a more limited aspect, the rib means can be a rigid protrusion formed integrally on the outer free end of one or both of the flanges and the gasket can be one or more separate gasket elements located between the flanges.

In addition, and in accordance with a more limited aspect, the flanges are preferably clamped together through the use of a plurality of uniformly and closely spaced threaded connectors passing through the flanges between the rib means and the gasket means.

In accordance with a still further aspect of the invention, a housing assembly for enclosing and storing cable splices generally comprises first and second end plates axially spaced from one another and defining a storage space therebetween. A rigid torsion bar member extends through the storage space and has its ends rigidly joined to the end plates. A pair of opposed housing members are contoured to enclose the end plates and the storage space. The housing members are releasably and sealingly clamped to each other and to the end plates. Carried by the torsion bar at axially spaced locations are a pair of outwardly extending rods. A plurality of splice storage trays are arranged in stacked relationship to extend between the pair of rods. The trays have axially open end slots which receive the rods and are guided on the rods. Suitable connecting means on the rods are arranged for releasably clamping the stack of trays together and to the rigid torsion bar.

Preferably, and in accordance with a more limited aspect, the rods that extend from the torsion bar are threaded and the connecting means comprise a strap member releasably joined thereon. By the use of this particular arrangement for supporting the splice trays relative to the interior of the housing assembly, it is possible to merely release the connecting means slightly and pivot one end of the stack of trays upwardly to remove their slotted ends from engagement with the rod at that end. Individual trays can then be pivoted out of position from the stack for access to the splices therein. This produces an extremely desirable arrangement since individual trays of the stack can be quickly removed without removing the entire stack of trays. Thus, replacing or adding additional splices or cables within any tray is possible.

In accordance with yet another aspect of the invention, the preferred form of splice tray include; a molded plastic tray having a generally flat rectangular bottom wall and spaced upwardly extending side walls joined by transversely extending end walls. A plurality of capture tabs are releasably joined to the tray to extend inwardly from at least the side walls at a first distance spaced from the bottom wall to overlie fiber optic cable when such cable is placed in the tray. The end walls carry outwardly opening slots generally centrally thereof for allowing the tray to be mounted between a pair of spaced parallel rods. Preferably, the tray has an overlying cover pivotally connected at one end wall.

In a more limited aspect of the invention, the capture tabs are releasably joined to the tray by having a downwardly extending portions resiliently gripped in retainer slots associated with the side walls. In addition, the side walls include means for allowing the capture tabs to be placed such that they extend outwardly over the bottom wall at different selected distances; therefrom.

A still further object of the invention is the provision of a housing assembly that includes first and second end plates axially spaced from one another and defining a storage space therebetween. A pair of rigid torsion bar members extend in spaced apart relationship through the storage space and have their ends joined to the end plates. Splice trays are supported in stacked relationship between the torsion bar members by supports extending from one of the torsion bars. The space between the end plates is enclosed by a pair of removable main, housing members that extend about and seal with the end plates. The size of the space enclosed and the number of end trays supported can be increased by changing the housing members and one of the torsion bar members. This can be done without disturbing the end plates or the stack of trays since the other torsion bar member holds the trays and the end plates.

In the preferred form, the trays are supported in stacked relationship by parallel rods extending from a torsion bar member with the ends of the stack of trays engaged with the rods. The changing of the housing and the associated torsion bar allows a greater number of trays to be carried by the rods by merely adding trays to the top of the stack.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 5a is an enlarged cross-sectional view taken on line 5a—5a of FIG. 5;

FIG. 5b is an enlarged cross-sectional view taken on line 5b—5b of FIG. 5;

FIG. 7 is an enlarged plan view of the circled areas of FIGS. 5 and 6 to show the latch mechanism used in retaining the cover members in a closed position on the splice trays;

FIG. 8 is an exploded isometric view of the storage tray and support assembly used in the housing assembly of FIGS. 1 and 2;

DETAILED DESCRIPTION OF THE PREFERRED EMBODIMENT

Figure 1:
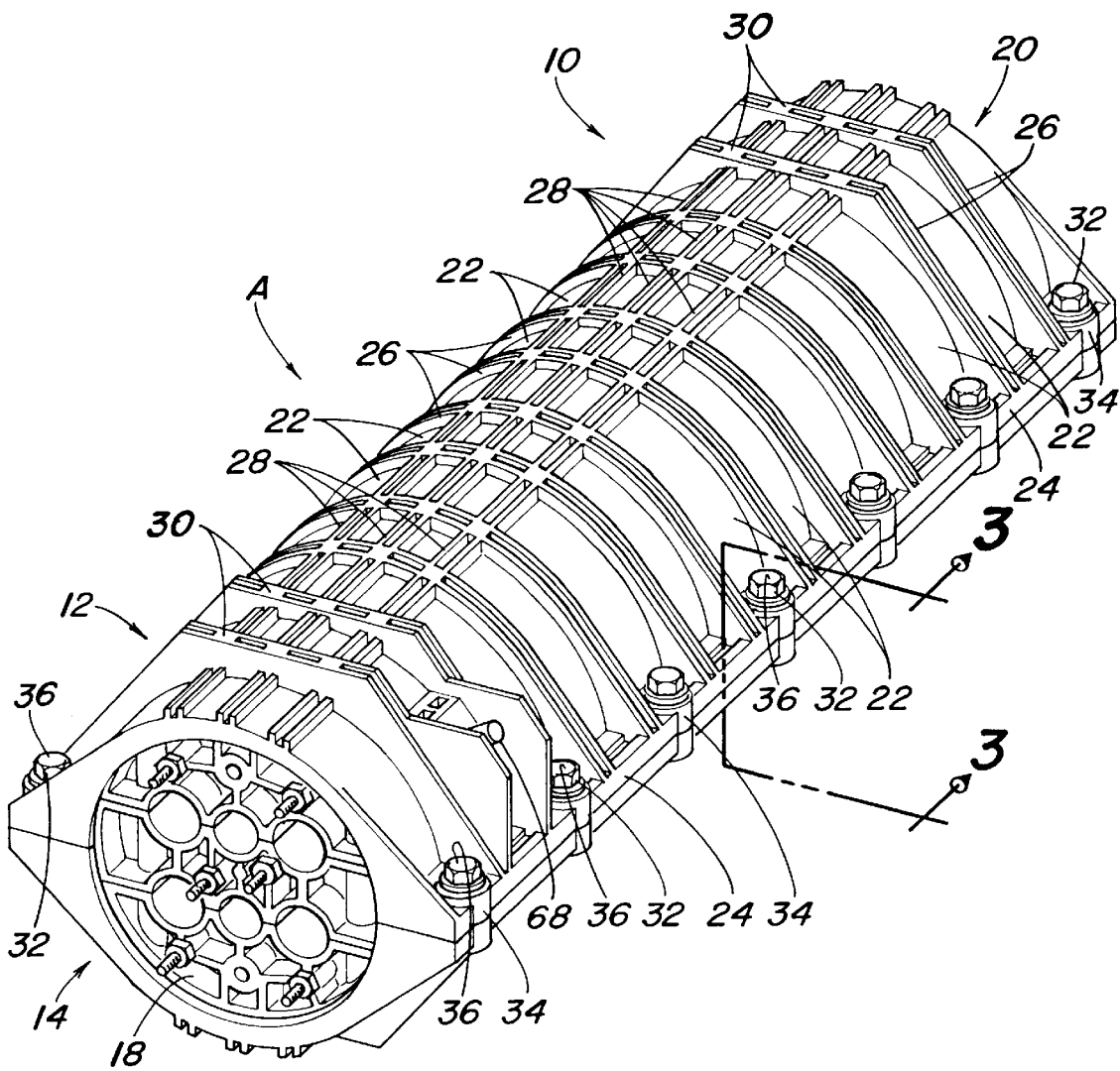
FIG. 1 is an isometric view of a preferred embodiment of a housing assembly intended for use in storing fiber optic cable splices.
Figure 2:
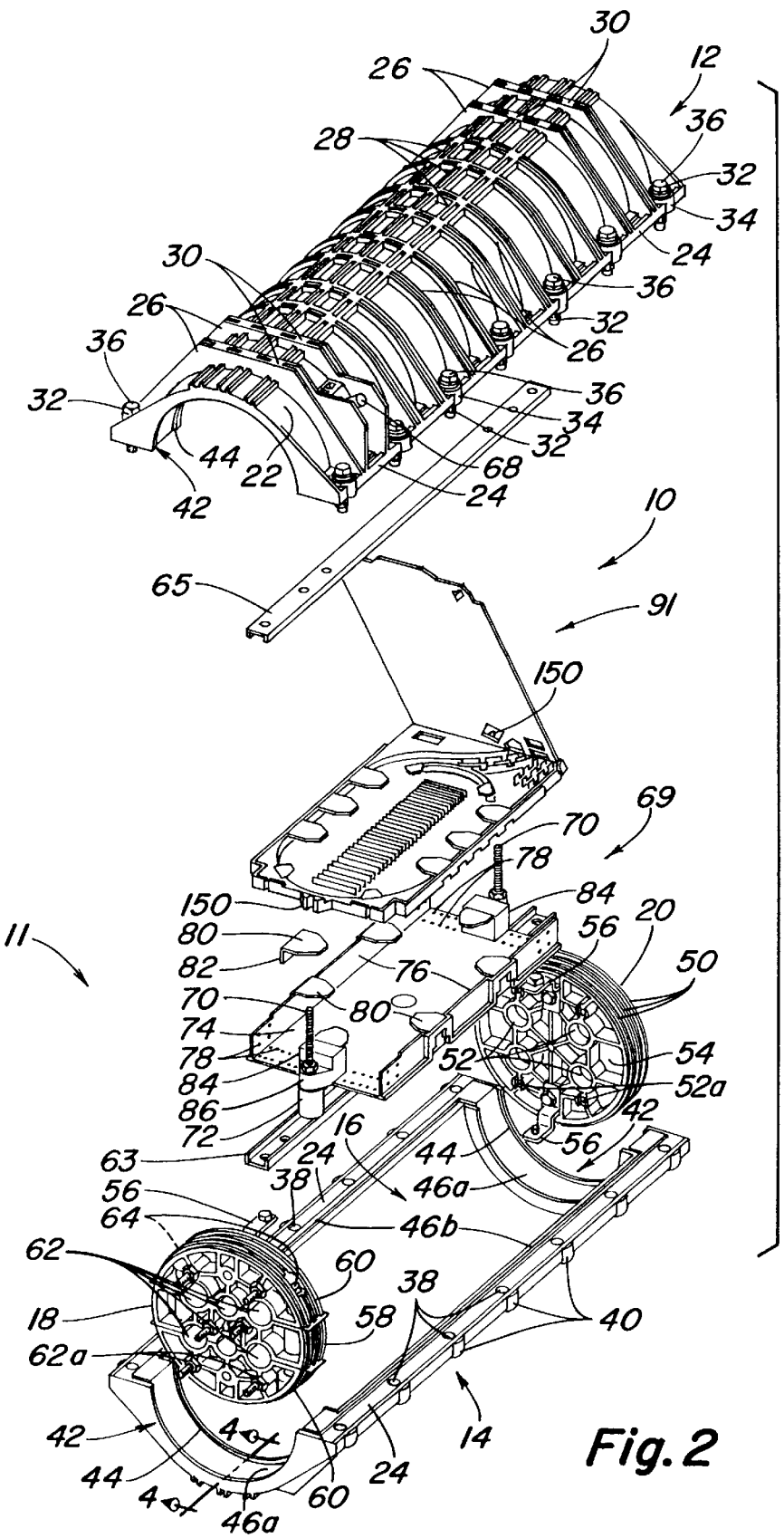
FIG. 2 is an exploded isometric view of the housing assembly of FIG. 1.

Referring now to the drawings wherein the showings are for the purposes of illustrating the preferred embodiment of the invention only and not for purposes of limiting same, the overall arrangement of the preferred construction of the splice case A can best be understood by reference to FIGS. 1 and 2. As illustrated therein, the main outer housing of splice case A comprises housing assembly 10 that houses and encloses a splice tray support assembly 11. The housing assembly 10 is generally formed by a pair of closely similar, opposed main housing or body members 12 and 14 which are joined together in sealed clamping relationship to define an axially elongated central storage chamber 16. The opposite ends of the storage chamber 16 are closed by cylindrical end plate members 18 and 20 that are releasably and sealingly engaged with the main housing members 12 and 14 in a manner subsequently to be described.

Although the housing body components and the end plates could be formed from a variety of different materials using different manufacturing techniques, in the subject embodiment, they are preferably injection molded from a suitable plastic containing fibers for reinforcement. For example, fiber glass filled and reinforced polypropylene is preferred.

The two main housing members 12, 14 are closely similar in overall shape and construction. Accordingly, a description of the body housing 12 is to be considered as equally applicable to body member 14 unless otherwise noted. In the embodiment under consideration, main housing member 12 has an elongated, semi-cylindrical configuration to define a somewhat shell-like body with a main outer semi-cylindrical wall 22 that has laterally extending clamping flanges 24 extending along each longitudinal side. The flanges 24 are in diametrical alignment relative to the wall 22 and define flat sealing and clamping surfaces that are continuous along each side. The main wall 22 is reinforced by radially extending, axially spaced ribs 26 formed integrally with the wall 22. Each of the ribs 26 extends circumferentially about the wall 22 and joins at its ends with the clamping flanges 24 as shown. In addition to the reinforcing ribs 26, there are preferably longitudinally extending ribs 28 which extend between the axial ends of wall 22 at the locations shown.

In order to facilitate assembly, disassembly, and use of the subject splice storage housing assembly 10, at least some of the ribs 26 are provided with a radially outer contour that allows the main body components 12, 14 to rest stably on a planar work surface. Referring to FIGS. 1 and 2, it will be seen that the last two reinforcing ribs 26 at each end of the housing are each provided with a planar top surface 30 that is preferably in a plane parallel with the plane of the clamping surfaces of the clamping flanges 24. As can be appreciated, this allows the housings or body portions 12, 14 to rest on a planar work surface while the assembly is being assembled or while fiber optic cable splicing is being carried out and installed in the housing.

The clamping together of the main body components 12, 14 could be accomplished with a variety of different releasable fasteners or clamping means. In the subject embodiment, however, the preferred form comprises a plurality of threaded stud bolt members 32 carried in the housing body portion 12 and having their lower threaded ends extending downwardly through the associated clamping flange 24. In the form shown, the stud bolts 32 are uniformly spaced along the respective clamping flange 24 in molded bosses 34. Preferably, the heads 36 of the stud bolts 34 are retained in the bosses by capture rings that allow the studs to be rotated but do not allow them to be readily removed from their functional position in the associated bosses 34.

Referring in particular to body portion 14, it will be seen that the clamping flanges 24 of body portion 14 include openings 38 that extend perpendicularly through the associated flange at locations corresponding to the stud bolts 32 carried by body member 12. Associated with each of the openings 38 is a propeller nut member (not. shown) that is captured in the bosses 40 formed on the. clamping flanges 24 of member 14. The two halves 12 and 14 can thus be clamped together by the stud bolts 32. The actual clamping and sealing arrangement will subsequently be described. For the present, however, it is noted that the longitudinally spaced axial ends of each of the body members 12 and 14 are provided with an inwardly extending end flange section 42 that is provided with a central groove 44 configured and sized so as to receive the outer peripheral edge of the associated end plate 18 or 20.

Figure 2A:
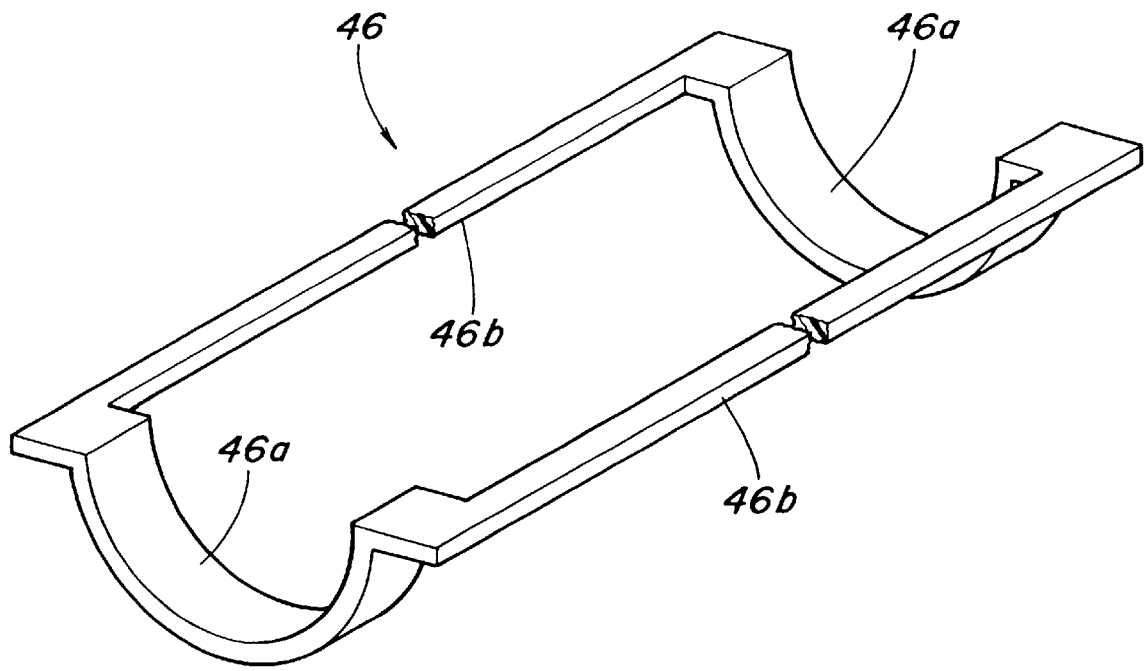
FIG. 2a is an isometric view showing the sealing gasket used between the main housing assembly components.

Associated with each of the recesses 44 and the longitudinally extending clamping surfaces of the clamping flanges 24 on each of the housing members 12 and 14 is a resilient sealing gasket member 46 best seen in FIG. 2A. One of the gaskets 46 is bonded into position in each of the main body members 12 and 14. As illustrated, the gasket members used in the subject embodiment generally comprise semi-cylindrical end portions 46a spaced and contoured to fit within the spaced recesses 44. The arcuate semi-cylindrical end portions 46a are joined by A relatively narrow longitudinally extending strips 46b. The positioning and arrangement of portions 46a and 46b can be seen in FIGS. 2, 3, and 4. Note that the sections 46b run closely adjacent the inner periphery of the wall 22 and the arcuate end portions 46a extend downwardly into the associated recess 44. Preferably, the recess 44 and the associated gasket portion 46a are provided with cooperating ribs and grooves 47 (shown in FIG. 4) to provide increased bonding surface and improve the retention and sealing ability of the gasket 46. In this regard, when the gaskets 46 are installed, a combination of mastic and adhesive is preferably used. For example, a mastic sealant is applied in the center grooves 47a and a suitable adhesive is installed in each of the outer grooves 47b.

Referring again to the end plates 18, 20, it should be understood that the ends plates are sized and shaped so as to be closely and tightly received within the recesses 46 so as to be sealingly engaged about their outer periphery by the associated gasket portions 46a in the bottom of recesses 44. The end plates 18, 20 are preferably molded from the same material as the main body sections 12 and 14. Referring first to end plate 20 (see FIGS. 2 and 9), it will be noted that the plate 20 has a circular outer periphery of an axial width to be closely received in the recesses 44. The plate 20 is a single,, unitary molding and is provided with a continuous outer periphery having a plurality of outwardly extending sealing ribs So formed thereabout. Ribs 50 are arranged to sealingly engage with the gasket portion 46a located in the bottom of recess 44. Suitable cable openings 52 are formed centrally of the end plate and any desired number could be provided. In the subject embodiment, there are four cable openings 52. Preferably, the openings 52 are normally sealed by molded-in knockout elements that can be driver from within the openings 52 when it is desired to use them. Suitable cross bracing and ribs extend between the outer circular periphery and the openings 52 and join integrally, with the main disk wall 54. Spaced metal angle brackets 56 are shown bolted in position to the internal surface of the end plate 20. The purpose and functioning of the brackets 56 will subsequently be described.

Also formed in the end plate 20 are additional small openings 52a with one such opening associated with each cable opening 52. These openings provide a means for bolting cable strength member connecting brackets to the end plates in the manner and for the purpose to be described with reference to end plate 18.

The end plate 18 is closely similar in construction, to end plate 20, but it is a three-part structure comprising a central section 58 and duplicate outer sections 60. The components are molded in the configuration shown and are arranged to define six cable through openings 62. The openings 62 can be of any desired size, either all of the same size or a variety of different sizes. In the subject embodiment, however, the four outer openings are of equal size and the two inner openings are smaller but equal in size to each other.

The components 58 and 60 are joined in the shape and configuration shown by a pair of tie bolts 64 extending through vertically aligned openings. The exterior sealing surfaces of the sections 58, 60 are provided with radially extending rib portions in the manner of ribs 50 previously described with respect to end plate 20. The use of the three-part end plate is, in some respects, preferred because it allows the cables to be placed in position prior to joining the end plate members if desired. Those openings 62 which are not to be used can, of course, be sealed with suitable plugs clamped in position or otherwise plugged. Preferably, the unit is provided with plugs having opposite ends of different sizes to correspond to the two different sized openings. This permits each plug to be used for plugging either sized opening.

Figure 9:
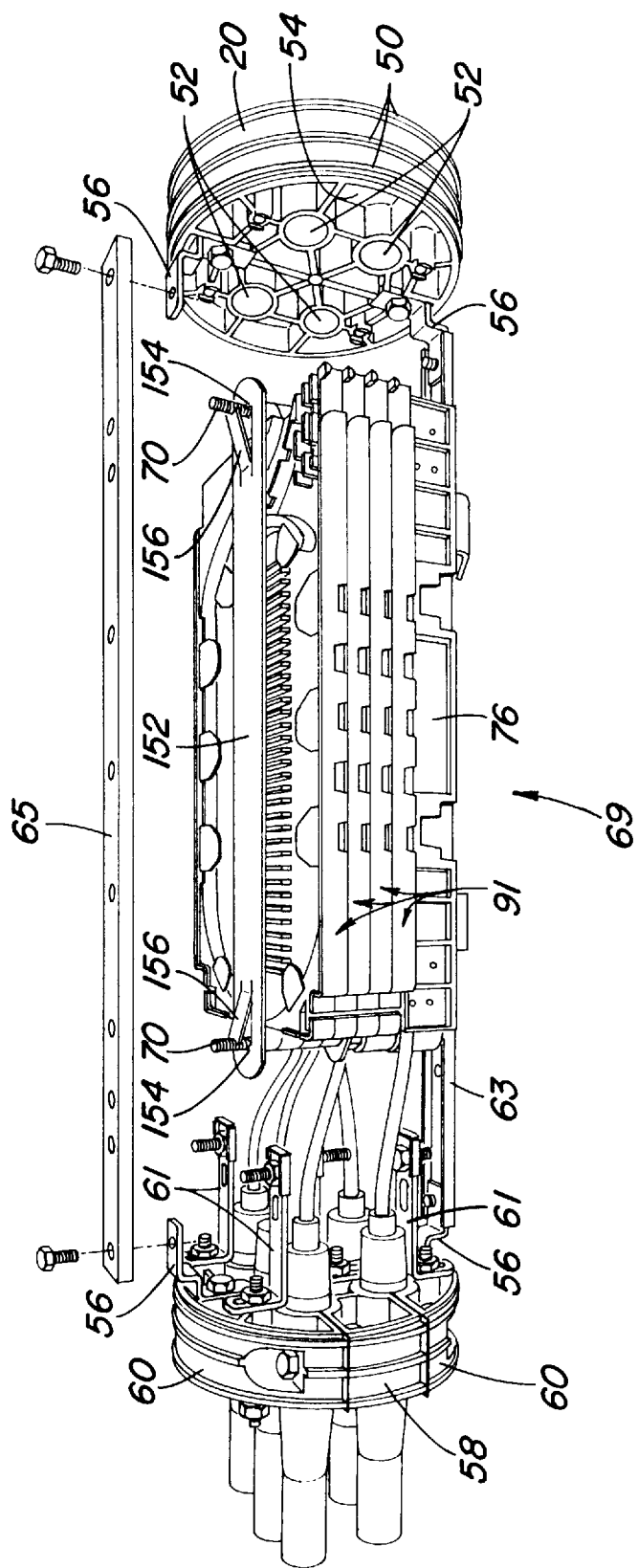

As best seen in FIG. 9, it should be noted that each opening 62 has a cable strength member bracket 61 and a connecting opening 62a associated therewith. To explain the function of the strength member brackets, each fiber optic cable generally carries an elongated wire-like strength member intended to add strength to the cables or, more accurately, to the fiber transport tube within the cable. These strength members are cut away from the transport tubes after the cables pass into the enclosure. In order to anchor the cables to the closure, it is necessary to affix the strength members to the strength member brackets. Further, because the strength members expand and contract at a different rate than the fibers; themselves, it is important that the movements of the strength member not be transmitted to the splices or the fibers. The strength member connecting brackets thus serve not only to firmly anchor the cables to the closures, but: also to isolate the splices and fibers from movements caused by expansion and contraction of the strength member.

The end plates 18 and 20 are rigidly joined in proper alignment and spaced apart relationship by metal torque or torsion bar members in the nature of tie rods 63, 65 that extend between the brackets 56 on each end plate. The lower bar member 63 is, of course, bolted to the lowermost bracket 56 on each end plate and the upper bar member 65 is releasably bolted parallel thereto between the upper pair of brackets 56. This arrangement makes the end plates and the tray support assembly into an independent, rigid, and unitary sub-assembly that does not depend on the outer housing members for its structural strength and integrity. The importance of this arrangement will. subsequently become apparent.

Figure 3:
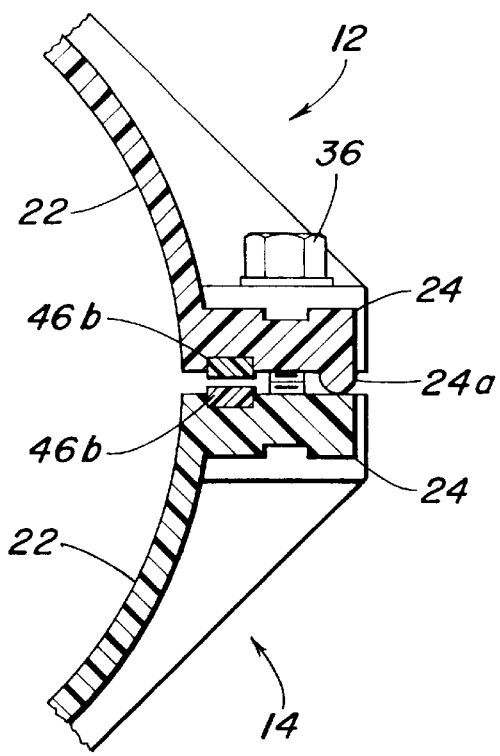
FIG. 3 is a cross-sectional view, somewhat enlarged, showing a detail of construction (the view is taken on line 3—3 of FIG. 1)
Figure 4:
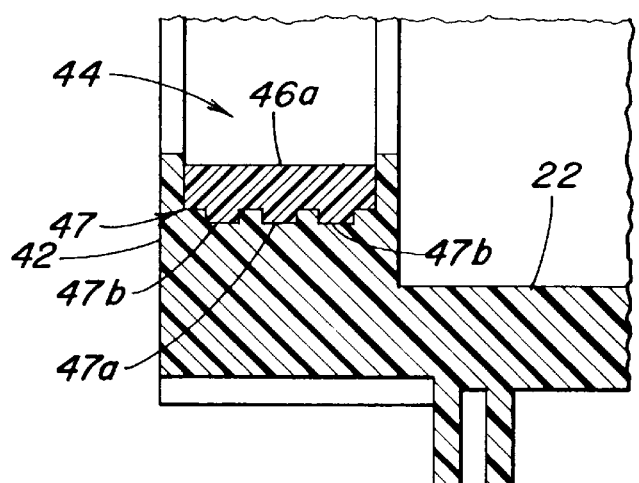
FIG. 4 is a cross-sectional view, somewhat enlarged, taken on line 4—4 of FIG. 2.

Referring more particularly to FIG. 3, the arrangement of the clamping flanges will be described in greater detail to show the arrangement whereby an improved sealing is obtained. In particular, as shown in FIG. 3, the flanges 24 on member 12 are provided at their outer free end with a rib-like protrusion 24a that extends downwardly from the associated flange surface toward the opposed flange portion 24a of member 14. The total height of the rigid ribs 24a is such that, in the normal engaged position, the gasket portions 46b are spaced apart as shown in FIG. 3. As the stud bolts 36 are tightened, however, the flanges 24 pivot toward one another about the rigid ribs 24a and the opposed gasket portions 46b carried on the respective halves 12 and 14 are driven toward one another and brought into sealing engagement. This arrangement of pivoting the flanges and deflecting them about the rigid ribs 24a provides an improved torquing and sealing of the gaskets.

After the halves have been sealed and brought together, testing is possible to determine if a full fluid seal has been achieved. For this reason, the main body section 12 is provided with a pressurizing valve 68 as seen in FIGS. 1 and 2. A suitable pressurized testing fluid or gas can be fed to the interior chamber 16 through this valve to determine the quality of the seal.

Figure 8A:
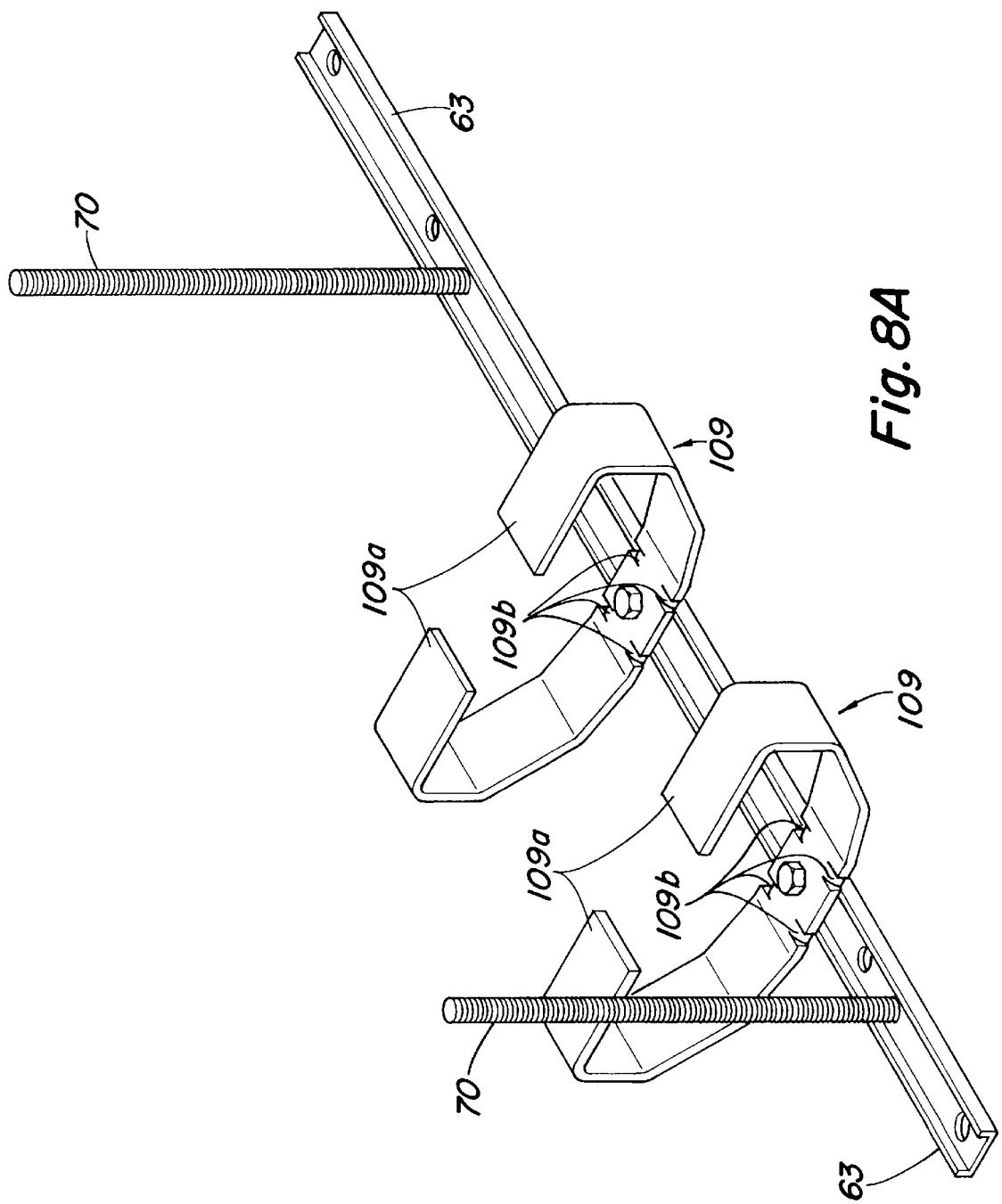
FIG. 8A is an isometric view of an alternative form of the storage area wherein the storage tray is eliminated and a cable storage area provided by using bracket members joined to the lower support bar; and, FIG. 9 is a pictorial view showing a typical "in-use" arrangement of a splice case of the invention with the shell-like, main housing members removed.

As previously mentioned, mounted within the chamber 16 is tray support assembly 11 that carries one or more splice trays and also makes provision for storage of excess cable. The preferred form is shown in FIGS. 2 and 8 and a modified form is shown in FIG. 8A. The FIGS. 2 and 8 form is intended for use with Unitube type fiber optic cable and includes a storage tray 69. The form of FIG. 8A is intended for use with buffered cable and relies on brackets that provide an open space under the splice trays for storage of excess lengths of cable.

In the FIGS. 2 and 8 form, the storage tray 69, as well as the superposed splice trays, are supported from the lower tie rod member 63 which connects between the bottom brackets 56 and is suitably connected thereto by releasable bolts. As previously mentioned, an upper tie rod member also connects between the upper brackets 56 so that the two tie rods extend generally in parallel and serve to position and properly space the end plates as well as to hold them in suitable alignment and add substantial strength to the entire assembly. In this form, the storage tray 69 is, as previously mentioned, directly supported from and connected to the lower tie rod 63. Note that a pair of parallel spaced threaded rods or bolts 70 extend upwardly from and through suitable openings in the lower tie rod. The rods 70 have suitable spacers 72 received thereon to maintain the storage tray 69 at a desired elevation above the tie rod. In this arrangement, as mentioned above, the storage tray 69 is intended to maintain and provide a place where extra lengths of Unitube type optical cable can be coiled and retained as may subsequently be needed for changing or adding splices.

Although the storage tray could take a variety of different configurations, it is shown as a generally U-shaped, rectangular box having a bottom wall 74 and upwardly extending side walls 76. The opposite ends of the rectangular box structure are open so as to allow ready access and free receipt of the cable which is intended to be coiled and stored in the storage tray. Adjacent the ends of both the bottom 74 and the side walls 76 are a plurality of through openings 78 which extend across the width of both the bottom and the side walls in the locations shown. These openings 78 provide means by which the cables can be firmly affixed to the storage tray through the use of conventional cable ties or the like. At the upper end of the side walls 76, there are provided removable L-shaped retainers 80 generally referred to as capture tabs. These L-shaped retainers 80 are releasably retained in suitable downwardly extending grooves formed in the side walls 76. The retainers each have a downwardly extending leg portion 82 that extends into an associated side wall recess for resilient retention therein. The retainers 80 can be removed during use of the assembly to allow positioning of cable coils in the tray. After positioning of the stored cable section within the storage tray, the retaining or capture tabs can be moved into position to hold the stored cable down properly relative to the bottom wall 74 and also, in a manner subsequently to be described, support the superjacent splice trays.

Referring more particularly to FIG. 8 and the opposite end portions of the base 74 of the storage tray, it will be seen that there are integrally formed thereon upwardly extending mounting post portions 84 which have an outwardly extending triangular section 86 carrying a central opening 88 for receipt of the associated threaded rod 70. When the tray is moved to the position shown in FIG. 2, a nut member 89 is threaded onto each of the rods and acts to rigidly lock the storage tray into position on the tie rod member 70. Additional stability and rigidity for the tray relative to the housing is provided, if desired, by suitable bent metal leg elements 90 joined to the undersurface of the bottom wall 74 and shaped, sized, and positioned so as to engage the curved inner surface of wall 22 of the main body 14. In addition, it should also be noted that the posts 84 preferably have a suitable slot formed in their upper surface for receiving one of the capture tabs as previously described with respect to the side walls 76.

If desired, a suitable cover 77 with end openings 77a sized and located to receive posts 78 can be positioned over the storage tray 69 to provide additional protection for the cable stored therein.

As mentioned earlier, the invention contemplates the use of brackets to support the superposed splice trays when the assembly is used with buffered cable. FIG. 8A shows the preferred form for the brackets 109 and their relationship to the lower bar member 63. In particular, each bracket 109 has a general U-shaped configuration with inwardly extending horizonal support portions 109a at the upper ends of the legs. The brackets are joined to the lower bar member 63 by suitable bolts as shown. Downwardly bent tabs 109b are arranged to engage on the lateral sides of member 63. These tabs center and locate the brackets and prevent their rotation relative to the member 63. The space within the brackets and beneath the support ports provides space for coiling and storing excess lengths of optic cable.

Figure 5:
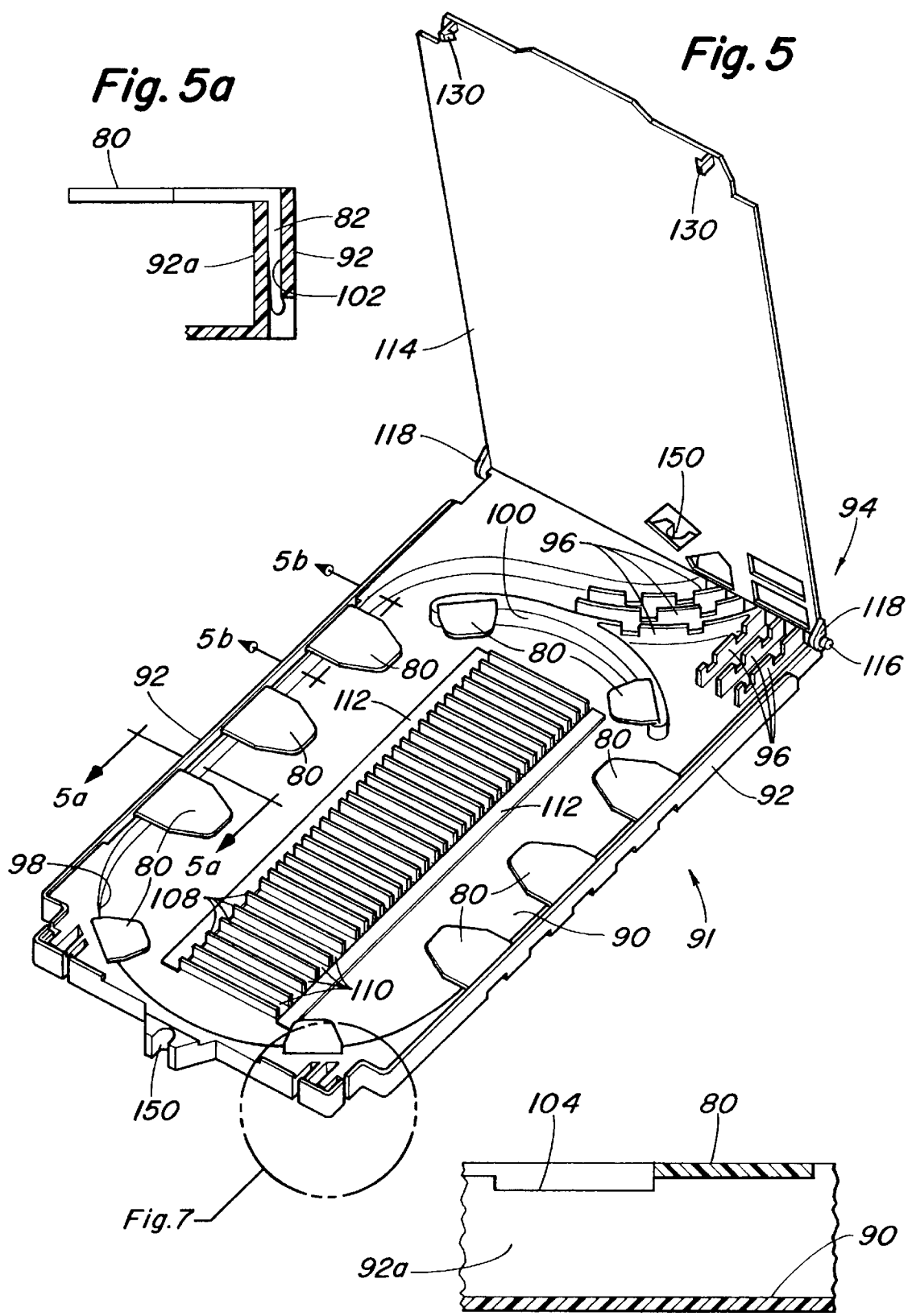
FIG. 5 is a greatly enlarged isometric view showing a first form of splice tray useful in the housing assembly illustrated in FIGS. 1 and 2.

As previously mentioned, one or more of the splice trays 91 are positioned in stacked relationship above the storage tray 69 or the brackets 109 and function to hold in an organized manner the splice connectors in the associated fiber cables. Although the splice trays could have a variety of configurations, the typical and preferred form for the trays in the subject embodiment is shown in FIGS. 5, 5A, and 5B. As illustrated therein, the splice tray 91 generally comprises a rectangular molded plastic tray member having an outer peripheral size and shape which is rectangular and generally corresponds to the size and shape of the subjacent storage tray. As illustrated in FIG. 5, the tray includes a flat bottom wall 90 and an upwardly extending side walls 92. The end walls are generally formed by upwardly extending integral formations with the upper end (as viewed in FIG. 5) being formed so as to provide a cable entrance area 94 which opens to the interior of the tray and includes a plurality of spaced vertically extending walls 96 which define a group of separate passages through which groups of fiber optic cable can be directed to the interior of the tray. The lower end of the tray of FIG. 5 has a contoured circular interior wall surface 98 which facilitates the bending of the cable and its positioning as coiled loops within the tray. Associated with the upper interior end of the tray is a raised arcuate wall 100 which also serves to direct the cable and allow it to be suitably coiled neatly about the interior of the tray.

Like the arrangement used in the storage tray, the splice tray shown in FIG. 5 is also provided with retainers or capture tabs 80 that are releasably retained in position by the side and end walls. FIG. 5A illustrates the manner in which the capture tabs are held in position in the side walls 92. In particular, the downwardly extending leg 82 of each capture tab 80 is releasably received in a longitudinally extending groove 102 formed along each wall 92. Similar grooves are provided for the capture tabs carried in the end walls and in the inner end wall 100.

Referring to FIG. 5B, it will be seen that an inner wall portion 92a on the interior side of the groove 102 is provided with sections varying in height by having its upper surface provided with notches 104 that extend downwardly from the top edge of the inner wall portion 92a. The notches 104 are of a length equal to the width of the capture tabs 80 so that they can be received therein. This allows the tabs to be shifted from the upper level illustrated in FIGS. 5 and 5A to a lower level as defined by the notch 104. The tabs, of course, must be shifted axially in so moving them. This shifting will become more apparent with the description of the tray form of FIG. 6. This shifting allows use of different types of cover members on the trays and also allows the retaining tabs to have different elevations relative to the bottom 90 of the associated tray to compensate for different quantities of fibers within the trays.

Associated with the bottom wall 90 of the tray are a plurality of upwardly extending resilient webs 108 that extend generally perpendicular to the sides and are preferably formed integrally with the bottom wall to define a multiplicity of upwardly open, transversely extending slots. The spacing between the webs 108 and thus the width of the slots is selected so as to allow the connectors used in forming the splices to be retained therein. These widths can vary at different points along the row of webs 108 so that various commercially available and commonly used connectors can be held in an organized and convenient: manner. Preferably, there are slots (not shown) through the bottom 90 of the tray at locations between webs 108 tea facilitate removal of the splice connectors held between the webs. That is, the slots allow a screw driver or the like to be inserted upwardly through the bottom of the tray to push the connectors out of the spaces between the webs. The subject embodiment also provides for the option of retaining the connectors and their associated fiber cables in their position through the use of strips of double-sided pressure sensitive adhesive tape 112 positioned in the bottom of the tray adjacent the opposite ends of the slots 110.

The tray of FIG. 5 is provided with a flat top 114 which is preferably molded from a clear plastic so as to allow viewing of the interior of the tray when the cover is in a closed position. FIG. 5 shows the cover 114 pivoted to an open position. Many different types of hinge arrangements could be used to allow the cover 114 to be hinged to the tray, but in the subject embodiment, suitable pivot pins 116 extend laterally outwardly from the side walls 92 and are engaged by integral hook members 118 extending downwardly from the cover 114. Preferably, the hook members 118 have the back side open so that when the cover is moved to its upper position shown, it can be simply pulled off of the pivot pins 116.

The covers are also arranged so as to latch to the tray when they are in their closed position. As best shown in FIG. 7, the end of the tray is provided at each outer corner with a latch arrangement that comprises a resilient L-shaped latch member 120 separated from the remainder of the tray by an open area 122 and an inwardly extending slot 124. A small protrusion 126 extends into the space 122 from the side of leg 120a of the L-shaped latch 120. As shown dotted, the latch 120 can be deflected to a dotted line position by application of a pushing force in the direction of arrow 128. This then moves the latch element 126 to the left as viewed in FIG. 7 cooperating with the latch element 127 and engageable under the protrusion 126 is a hook 130 carried on the underside of cover 114 (see FIG. 5) and arranged to enter into the space 122 adjacent the protrusion 126 to hook thereunder and retain the cover in the closed position. By forcing against the latch element 120 in the direction of arrow 128, the protrusion 126 can be moved laterally to release the hook 130 and allow the cover to be moved to its open position. Although only one of the latch end hook elements 130 has been described, it should be noted that a second duplicate set of opposite hand is provided at the other corner of the tray and the cover.

Figure 6:
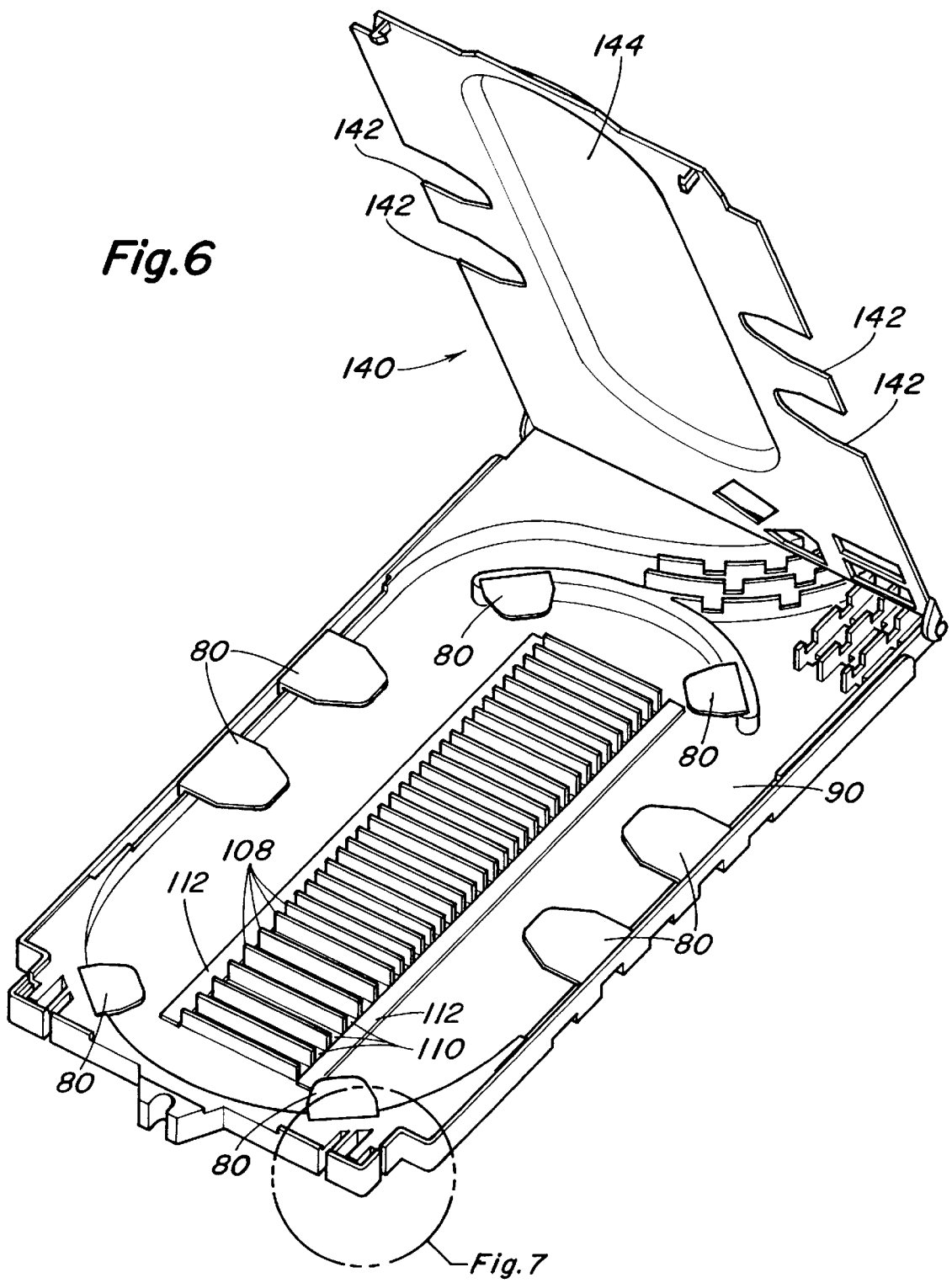
FIG. 6 is a view similar to FIG. 5 but showing the splice tray having a modified cover and a different arrangement of retaining tabs.

FIG. 6 shows a second, slightly modified form of splice tray and further illustrates the previously-mentioned multiple positioning possible with the capture tabs 80. In the FIG. 6 embodiment, the capture tabs 80 are shown moved to the most elevated position. In this elevated position, greater space is available in the tray for housing fiber optic cable. Also, in this elevated position, the cover element 140 is preferably provided with recesses 142 along its edge located to allow the side tabs to be received therein. Moreover, the center of the cover is preferably domed as shown at 144 so that larger connectors can be housed in the slots 108.

The manner in which the splice trays 91 are engaged with and maintained in stacked relationship on tie rod 63 is best understood by reference to FIGS. 2 and 5. In particular, the trays 91 are each provided with end formations that define outwardly open slots 150. Slots 150 are sized and spaced to receive the spaced, threaded posts 70. A stack of two or more trays 91 can thus be positioned above the storage tray 69 and held in aligned stacked relationship thereon by posts 70. A suitable resilient plastic strap 152 is arranged for connection between the upper end of posts 70 and functions to clamp the stack of trays down in its located relationship relative to the tie rod 63 and the storage tray 69 or brackets 109. As illustrated, the strap 152 includes end openings 154 having resilient tabs 156 arranged to extend into engagement with the threaded posts 70 and releasable lock the strap thereto. However, merely by lifting the tabs, the strap can be removed.

An important advantage flowing from the described mounting of trays 91 relative to the posts 70 is that lower ones of the trays in the stored stack can be accessed without total removal of superposed trays. Merely by releasing the strap 152, one end of the stack can be lifted upwardly until the slots on that end are free of the associated post 70. Individual selected lower trays can than be pivoted outwardly from between the others in the stack while the other end of the tray remains engaged with the other post. After work within that tray is completed, it can be returned to its located position in the stack merely by reversing the procedure.

A primary advantage flowing from the housing construction of the preferred embodiment is the ability to increase the effective size of the storage chamber without disturbing or disassembling the previously assembled space trays 91 and the overall tray support assembly 11. To understand this aspect of the invention, it should be noted that, as previously discussed, the outer housing members 12 and 14 can be removed from their clamped engagement with the end plates 18 and 20 without affecting the structural integrity of the remaining structure, i.e., the end plates 18, 20, tie rods 63, 65, and the storage and splice trays. Thus, it is possible to reinstall main housing members having larger internal dimensions (so long as their end flange sections 42 correspond to the sizes of end plates 18 and 20). All this can take place without disturbing the previously made-up trays.

Figure 2B:
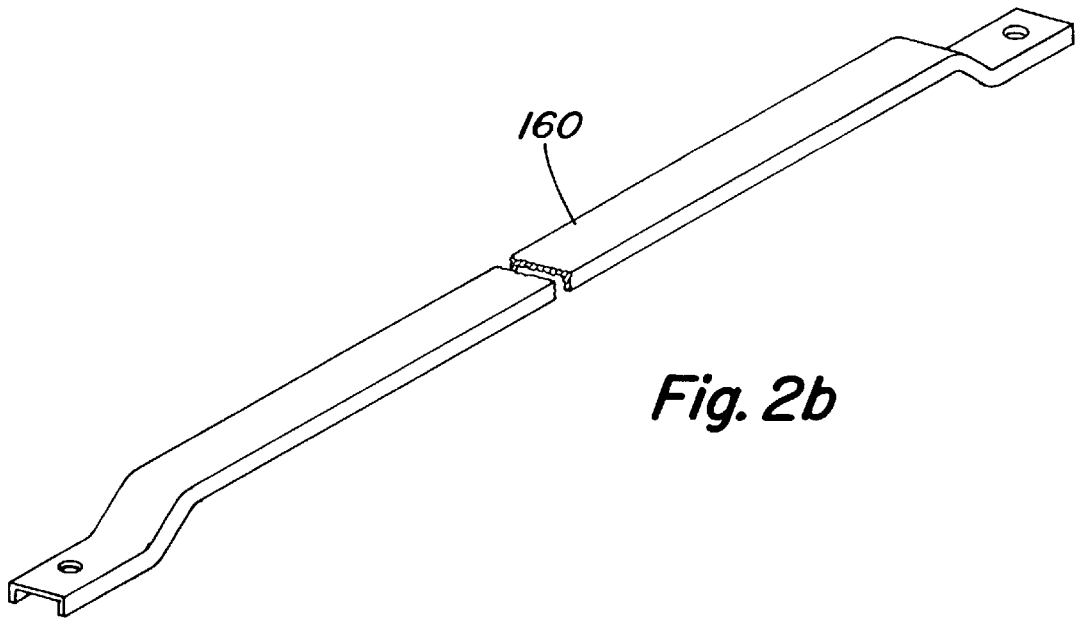
FIG. 2b is an isometric view of the modified form of upper torque bar that is used when the total storage space is being increased to its largest size.

In addition to the above, it is possible to further increase the space available for increasing the height of the storage tray stack to thus allow more trays to be installed beyond what was the maximum available originally. This can be accomplished by removing the upper tie rod 63 and replacing it with a modified tie rod 160 as illustrated in FIG. 2*b*. Note that removal and replacement of the upper tie rod does not really affect or alter the end plate and storage tray subassembly's structural integrity. The modified tie rod does, however, provide additional space for increasing the height of the storage tray stack because of its bowed or upwardly bent center section. Also, if desired or necessary, the height of the rods 70 can be increased by suitable extensions added to their upper ends.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A convertible cable splice enclosure system comprising:
   first and second end plates axially spaced from one another and defining a storage space therebetween;
   a pair of rigid support bars extending in spaced apart parallel relationship through the storage space and having their ends rigidly joined to the end plates;
   a pair of rods carried by one of the rigid bars at axially spaced locations;
   a plurality of splice trays in stacked relationship and extending between the pair of rods, the trays having end slots which receive and are guided on the rods;
   connecting members on the rods for releasably clamping the plurality of splice trays together; and,
   a one of a first and second set of housing members, the first set of housing members and the second set of housing members being adapted to selectively engage the first and second end plates and enclose the storage space to respectively define a first enclosed space and a second enclosed space larger than said first enclosed space.

2. The convertible cable splice enclosure system according to claim 1 wherein:
   the first set of housing members include a first pair of semi-cylindrical opposed shell-like members which extend around the first and second end plates and are connected to each other by releasable fasteners; and,
   the second set of housing members include a second pair of semi-cylindrical opposed shell-like members which extend around the first and second end plates and are connected to each other by said releasable fasteners.

3. The convertible cable splice enclosure system according to claim 2 wherein:
   the first pair of semi-cylindrical opposed shell-like members include first connecting flanges that extend axially thereof; and,
   the second pair of semi-cylindrical opposed shell-like members include second connecting flanges that extend axially thereof.

4. The convertible cable splice enclosure system according to claim 3 further comprising a first gasket member adapted to selectively seal an interface between the first pair of semi-cylindrical opposed shell-like members and said first and second end plates, and between the second pair of semi-cylindrical opposed shell-like members and said first and second end plates.

5. The convertible cable splice enclosure system according to claim 1 further comprising a plurality of sets of housing members each set of the plurality of sets of housing members being adapted to selectively engage the first and second end plates and enclose the storage space to respectively define a plurality of enclosed spaces of varied sizes.

6. The convertible cable splice enclosure system according to claim 5 wherein each set of the plurality of sets of housing members include a first pair of semi-cylindrical opposed shell-like members adapted to extend around the first and second end plates and connect to each other by releasable fasteners.

7. The convertible cable splice enclosure system according to claim 6 wherein each of said plurality of pairs of semi-cylindrical opposed shell-like members include opposed intermatable connecting flanges that extend axially thereof.

8. The convertible cable splice enclosure system according to claim 7 further comprising a first gasket member adapted to selectively seal an interface between each of said plurality of pairs of semi-cylindrical opposed shell-like members and said first and second end plates.

9. A convertible cable splice enclosure system comprising:
   an end plate;
   a support bar rigidly joined to the end plate and extending from the end plate;
   a plurality of splice trays disposed in a stacked relationship on said support bar; and, a one of a plurality of sets of intermatable housing members, each set of intermatable housing members being adapted to selectively engage the end plate and enclose the plurality of splice trays to respectively define a plurality of fluid sealed enclosed spaces of varied sizes.

10. The convertible cable splice enclosure system according to claim 9 wherein each set of intermatable housing members include a pair of semi-cylindrical opposed shell-like members adapted to seal around the end plate and connect to each other by releasable fasteners.

11. The convertible cable splice enclosure system according to claim 10 wherein each pair of said semi-cylindrical oppose shell-like members include opposed intermatable connecting flanges that extend axially thereof.

12. The convertible cable splice enclosure system according to claim 11 further comprising a first gasket member adapted to selectively seal an interface between each of said plurality of pairs of semi-cylindrical opposed shell-like members and said end plate.

13. A convertible cable splice enclosure system comprising:
   an end plate;
   a support bar rigidly joined to the end plate and extending from the end plate;
   a plurality of splice trays disposed in a stacked relationship on said support bar; and,
   a one of a plurality of sets of intermatable housing members, each set of intermatable housing members being adapted to selectively engage the end plate and enclose the plurality of splice trays to respectively define a plurality of enclosed spaces of varied sizes,
   each set of intermatable housing members including a pair of semi-cylindrical opposed shell-like members adapted to seal around the end plate and connect to each other by releasable fasteners.

14. The convertible cable splice enclosure system according to claim 13 wherein each of said plurality of pairs of semi-cylindrical opposed shell-like members include opposed intermatable connecting flanges that extend axially thereof.

15. The convertible cable splice enclosure system according to claim 14 further comprising a first gasket member adapted to selectively seal an interface between each of said plurality of pairs of semi-cylindrical opposed shell-like members and said end plate.

16. A method of changing the size of a space enclosed by a housing assembly in a cable splice enclosure assembly, the method comprising the steps of:
   providing a cable splice subassembly including:
      first and second end plates axially spaced from one another and defining a storage space therebetween;
      a pair of rigid support bars extending in spaced apart parallel relationship through the storage space and having their ends rigidly joined to the end plates;
      a pair of rods carried by one of the rigid bars at axially spaced locations;
      a plurality of splice trays in stacked relationship and extending between the pair of rods, the trays having end slots which receive and are guided on the rods;
      connecting members on the rods for releasably clamping the plurality of splice trays together; and,
      a first set of housing members, the first set of housing members being adapted to selectively engage the first and second end plates and enclose the storage space to define
      a first enclosed space;
   providing a second set of housing members, the second set of housing members being adapted to selectively engage the first and second end plates and enclose the storage space to define a second enclosed space; and,
   replacing said first set of housing members on said first and second end plates with said second set of housing members to change the enclosed space from said first enclosed space to said second enclosed space.

17. The method of changing the size of a space enclosed by a housing assembly in a cable splice enclosure assembly according to claim 16 wherein:
   the step of providing the first set of housing members includes providing a first pair of intermatable semi-cylindrical opposed shell-like members adapted to extend around the first and second end plates; and,
   the step of providing the second set of housing members includes providing a second pair of intermatable semi-cylindrical opposed shell-like members adapted to extend around the first and second end plates.

18. The method of changing the size of a space enclosed by a housing assembly in a cabs splice enclosure assembly according to claim 17 wherein the step of replacing said first set of housing members includes disconnecting the first pair of intermatable semi-cylindrical opposed shell-like members along first connecting flanges that extend axially thereof.

19. The method of changing the size of a space enclosed by a housing assembly in a cable splice enclosure assembly according to claim 18 wherein the step of replacing said first set of housing members includes connecting the second pair of intermatable semi-cylindrical opposed shell-like members along second connecting flanges that extend axially thereof.

20. A method of changing the size of a space enclosed by a housing of a cable splice enclosure assembly, the method comprising the steps of:
   providing a cable splice subassembly including:
      an end plate;
      a rigid support bar extending from the end plate;
      a plurality of splice trays disposed in stacked relationship on said rigid support bar; and,
      a first set of housing members, the first set of housing members being adapted to selectively engage the end plate and enclose the plurality of splice trays to define a first fluid sealed enclosed space;
   providing a second set of housing members, the second set of housing members being adapted to selectively engage the end plate and enclose the plurality of splice trays to define a second fluid sealed enclosed space; and,
   replacing said first set of housing members on said end plate with said second set of housing members to change the space enclosed by the housing from said first fluid sealed enclosed space to said second fluid sealed enclosed space.

21. The method of changing the size of a space enclosed by a housing of a cable splice enclosure assembly according to claim 20 wherein:
   the step of providing the first set of housing members includes providing a first pair of intermatable semi-cylindrical opposed shell-like members adapted to extend around the end plate; and,
   the step of providing the second set of housing members includes providing a second pair of intermatable semi-cylindrical opposed shell-like members adapted to extend around the end plate.

22. The method of changing the size of a space enclosed by a housing of a cable splice enclosure assembly according to claim 21 wherein the step of replacing said first set of housing members includes disconnecting the first pair of intermatable semi-cylindrical opposed shell-like members along first connecting flanges that extend axially thereof.

23. The method of changing the size of a space enclosed by a housing of a cable splice enclosure assembly according to claim 22 wherein the step of replacing said first set of housing members includes connecting the second pair of intermatable semi-cylindrical opposed shell-like members along second connecting flanges that extend axially thereof.

* * * * *